United States Patent
Fox

[11] 3,867,336
[45] Feb. 18, 1975

[54] FLAME RETARDANT THERMOPLASTIC COMPOSITIONS

[75] Inventor: Daniel W. Fox, Pittsfield, Mass.

[73] Assignee: General Electric Company, Pittsfield, Mass.

[22] Filed: Apr. 13, 1973

[21] Appl. No.: 351,105

[52] U.S. Cl. ...... 260/45.7 R, 106/15 FP, 260/40 R, 260/DIG. 24
[51] Int. Cl. ............................................. C08g 23/00
[58] Field of Search .... 260/45.7 R, DIG. 24, 613 R, 260/40 R; 106/15 FP

[56] References Cited
UNITED STATES PATENTS

| | | | |
|---|---|---|---|
| 3,220,979 | 11/1965 | McNelis | 260/613 R X |
| 3,347,822 | 10/1967 | Jenkner | 260/45.7 R X |
| 3,622,541 | 11/1971 | Darsow et al. | 260/DIG. 24 X |
| 3,624,024 | 11/1971 | Caldwell et al. | 260/45.7 R X |
| 3,671,487 | 6/1972 | Abolins | 260/40 R |

FOREIGN PATENTS OR APPLICATIONS

| | | | |
|---|---|---|---|
| 753,292 | 2/1967 | Canada | 260/613 R |

Primary Examiner—Morris Liebman
Assistant Examiner—S. M. Person
Attorney, Agent, or Firm—William F. Mufatti, Esq.; George B. Finnegan, Jr.; Rocco S. Barrese

[57] ABSTRACT

Normally flammable thermoplastic resins, including those with high ignition temperatures, such as poly-(alkylene terephthalates) are rendered self-extinguishing by incorporation of an additive comprising an aryloxy-substituted poly halogenated aromatic compounds. The aryloxy substitution in the additive facilitates processing and substantially suppresses any tendency of the additive to plate out onto the surface of articles molded from the compositions.

11 Claims, No Drawings

FLAME RETARDANT THERMOPLASTIC COMPOSITIONS

This invention relates to thermoplastic compositions containing improved polyhalogenated flame retardant additives. More particularly, it is concerned with combinations comprising normally flammable thermoplastic resins and flame retardant amounts of an additive comprising an aryloxy-substituted polyhalogenated phenyl, polyhalogenated diphenyl or polyhalogenated diphenyl ether.

BACKGROUND OF THE INVENTION

The use of certain additives for the purpose of reducing the flammability of various thermoplastic polymers is well known to those skilled in the art. Flame retardant thermoplastic compositions are desired for many fields of use, such as in home construction, automobile and aircraft manufacture, packaging, electrical equipment, and the like.

Many thermoplastics ignite at relatively low temperatures and others have high ignition temperatures. Among the former can be mentioned polystyrene, polyethylene, cellulose esters, e.g., cellulose acetate and cellulose nitrate, and polyesters, e.g., poly(ethylene terephthalate). These resins are generally regarded to be highly flammable. On the other hand, some thermoplastics, such as the aromatic polycarbamates, polyphenylene ethers, polysulfones, polybenzimidazoles, polyamides, and the like ignite at temperatures far in excess of the others, e.g., at above 700°F., or so. Although not considered to be highly flammable, they still are potentially dangerous unless rendered flame retardant. For convenience, all such resins will be classified herein as "normally flammable" because, although there is a high ignition temperature, a polycarbonate, for example, can support combustion beyond 20 seconds after ignition and subsequent removal of the igniting source and, in particular, burning is seen in thin sections.

It is therefore desirable to provide compositions which will not support combustion beyond a few seconds, both for the highly flammable resins, but in particular, even for those of high ignition temperature.

Completely halogenated aromatic cocmpounds are of interest as flame retardant additives for all such polymers. Decabromodiphenyl ether is an example of this class of compounds, as is hexabromobenzene. These potential flame retardant additives are, however, functionally deficient in combination with certain resins, and it would be desirable to correct some of these deficiencies by modifying such compounds to alter their melting points, compatibilities and/or volatilities. For example, decabromodiphenyl ether is reported to melt at 306°C., which detracts from easy melt compounding. Furthermore, completely halogenated aromatic compounds are somewhat volatile. Decabromodiphenyl ether, for example, is so volatile that it has a tendency to evaporate out of resin combinations and cause an effect called "plate out" during molding. Plate out describes a condition in which a solid material accumulates on mold surface and causes surface imperfections in the finished molded parts. When plate out is severe, it is necessary to clean the molds between each mold cycle, and this is intolerable.

It has now been discovered that completely halogenated organic compounds can be modified to make them more useful in combination with normally flammable thermoplastic resins to form flame retardant compositions. According to this invention, if brominated or chlorinated aromatic compounds are treated with alkali aryloxides at elevated temperature in a solution of a phenolic compounds, one or more of the halogens will be replaced by an aryloxy substituent. By means of such treatment, the halogenated aromatic compounds are modified, e.g., decabromodiphenyl ether is changed from a difficulty soluble crystalline compound melting at about 300°C., to a soluble, low melting (50°–70°C.) glass. When such modified compounds are used in combination with resins, e.g., a polyester resin, in flame retardant amounts, melt processing is facilitated and plate out is almost completely suppressed.

Other objects and advantages of the invention will become apparent from the following detailed description.

DESCRIPTION OF THE INVENTION

According to this invention there are provided flame retardant thermoplastic compositions comprising:
a. a normally flammable thermoplastic resin; and
b. a flame retardant amount of either
   i. an additive of the general formula

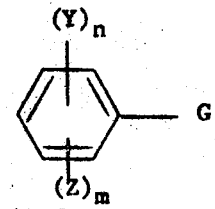

wherein Y is bromine or chlorine and mixtures thereof;
Z is mono or dicarbocyclic aryloxy, and mixtures thereof;
G is bromine, chlorine or

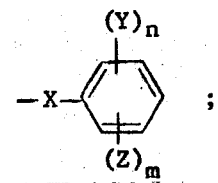

X is a direct bond or —O—; and
$n$ is 3, 4 or 5 and $m$ is 0, 1 or 2, at least one of the $m$'s always being other than 0, and mixtures of the above additives or
   ii. a combination of said additive (i) and an inorganic or organic antimony-containing compound.

When used herein, the term "flame retardant" is used in the sense that the resistance to combustibility of the composition is significantly increased in comparison with control samples. A suitable direct measurement of combustibility is the Oxygen Index Test or LOI (Limiting Oxygen Index). This test measures a product's combustibility based on the oxygen content of the combustion atmosphere. Appropriate specimens are placed in a combustion chimney and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame retardant additives of the specified types in the specified amounts have a substantially higher oxygen index and thus are much less combustible than compositions without flame retardant additives.

Another useful criterion for measuring flame retardancy is to determine if the composition qualifies to be designated "non-burning" or "self-extinguishing" by the tests set forth in Underwriters' Laboratories Bulletin No. 94. In such tests if the specimens extinguish themselves within 5 to 30 seconds, after two 10-second ignitions in an open flame, flame retardancy has been established.

The term "normally flammable thermoplastic resin" includes those types generally described above, including those which ignite at relatively low and at relatively high temperatures. It is intended to exclude resins which are not normally flammable, because they inherently contain, or are modified to contain, elements, such as halogen, phosphorous, large quantities of nitrogen and the like, which render them flame retardant. Illustrative of resins which are not "normally flammable" and therefore not included as the primary resin component (a) in the compositions of the present invention are polyvinyl chloride, polytetrafluoroethylene, chlorinated polyethylene, polyesters of halogenated anhydrides, high molecular weight halogenated aromatic polycarbonates, and the like.

By way of illustration, the normally flammable thermoplastic resin can be selected from a polymerization product of a vinyl monomer, e.g., a vinyl aromatic compound, such as styrene, vinyl toluene, vinyl naphthalene, divinyl benzene, or mixtures thereof; vinyl esters, e.g., vinyl acetate or vinyl butyrate, methylene methyl malonate; a polymerization product of an olefinic monomer, such as ethylene, propylene, 1- and 2-butene, 1-decene, or a diolefin, such as butadiene or isoprene, and the like, including interpolymerization products thereof with vinyl monomers, e.g., butadiene styrene copolymers, and terpolymers with alkenyl cyanides, e.g., acrylonitrile; a polymerization product of an acrylic or methacrylic monomer, e.g., acrylic acid, methyl acrylate, ethyl acrylate, n-propyl acrylate, isopropyl acrylate, n-butyl acrylate, t-butyl acrylate, hexyl acrylate and the corresponding alkyl methacrylates; polymerization products of allyl monomers, such as methyl allyl ketone, ethyl vinyl diallyl ether, N-allyl caprolactam, N-allyl acrylamide; a polymerization product of an unsaturated ketone, e.g., methyl vinyl ketone, and the like; a polyamide, such as adipic acid-hexamethylenediamine reaction products; cellulosic esters, such as cellulose acetate, cellulsoe butyrate, cellulose nitrate; aromatic polycarbonates, such as phosgene-bisphenol-A reaction products; polyphenylene ethers, such as poly(2,6-dimethyl-1,4-phenylene)-ether and poly(2,6-diphenyl-1,4-phenylene) ether alone and in combination with styrene resins; the polysulfones, such as polyphenylene sulfone; polybenzimidazoles; and polyesters, such as wholly aromatic polyesters, e.g., hydroquinone-terephthaloyl chloride reaction products; wholly aliphatic polyesters, and poly(alkylene iso and terephthalates), such as the highly polymerized reaction products of an ester of the corresponding phthalic acid with a glycol, such as described in U.S. Pat. No. 2,465,319 and 3,047,539, and elsewhere.

In especially preferred embodiments of this invention, the normally flammable thermoplastic resin component will be a poly(alkylene terephthalate, isophthalate or mixed isophthalate-terephthalate (up to 35 mol. % iso)), the alkylene groups containing from 2 to 10 carbon atoms, e.g., poly(ethylene terephthalate) or poly(1,4-butylene terephthalate). Such resins are widely available commercially and can be prepared by procedures known by those skilled in the art.

The additives used in the flame retardant compositions of this invention have the general formula

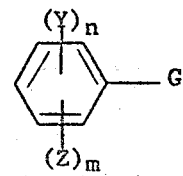

wherein G, X, Y, Z, $m$ and $n$ are as defined herein above.

These can be prepared by reacting the corresponding halogenated compound of the formula

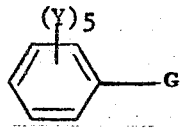

wherein G, X and Y are as above-defined, with an alkali metal aryloxide of the formula $$Z - O M$$

wherein M is alkali metal, preferably potassium or sodium and Z is an aryl or substituted aryl group, e.g., phenyl or naphthyl, or alkyl-substituted, e.g., methylphenyl, dimethylphenyl, trimethylphenyl or methyl naphthyl, etc., or alkoxy-substituted, e.g., methoxyphenyl, etc., of from about 6 to about 24 carbon atoms.

Those skilled in the art will recognize that such a reaction is essentially an Ullmann type condensation of an alkali aryloxide and an aryl halide. The reaction is catalyzed by copper and proceeds most readily in a solvent which maintains all reactants in solution. In the particular cases under consideration, phenol preferably is used both as a solvent and as a reactant. For convenience, one should use approximately the same weight of phenol as decabromodiphenyl ether and/or the corresponding other halogenated aromatic compounds. The controlling factor is the amount of alkali which is added. Thus, if one used 1 mole of bromo or chloro compound and wishes to monophenoxylate, one mole of sodium hydroxide or potassium hydroxide will be used even if a large excess of phenol is present, the reaction proceeds vigorously after water resulting from the reaction between the alkali and the phenol has been removed. Typically, the procedure consists of heating all reactants to approximately the boiling point of phenol at which time a small amount of water is evolved. Then follows an exothermal reaction which is essentially complete in a few minutes. Then heating is continued, e.g., under reflux if excess phenol is used as a solvent, for about ½ to 2 hours. The exothermic reaction can be controlled more readily, especially in larger batches, if the alkali metal hydroxide is added in several portions, taking each one to the stage of reaction, cooling, adding more caustic and repeating the procedure. The product can be recovered by any convenient means. For example, a solvent, e.g., toluene can be added to the reaction mixture, then the mixture can be washed free of unreacted phenol with excess caustic solution. The organic solution can be passed through adsorbant alumina and, after evaporation of the solvent, the product remains as a residue. Suitable procedures will be illustrated in detail hereinafter.

Illustrative of the halogenated compounds used to prepare the aryloxylated compounds of this invention are hexabromobenzene, decabromodiphenyl, decachlorodiphenyl, the heptabromodiphenyl ether, hexabromodiphenyl ether, octabromodiphenyl ethers described in U.S. Pat. No. 3,624,024, and their corresponding chloro-, and mixed chloro- and bromo analogs and the corresponding diphenyls, such as 2,3,4,2',-3',4'-hexabromodiphenyl, 2,3,4,2',3',4'-hexachlorodiphenyl and the like.

Among the aryloxy compounds used to prepare the additives of this invention are phenol, o-methylphenyl, 2,6-dimethylphenol, 1-naphthol, 2-naphthol, 1-methyl-2-naphthol, 2-methyl-1-naphthol, and the like.

As has been mentioned, it is a preferred feature of this invention to use the flame retardant additive in combination with a synergist. Suitable synergists include inorganic and organic antimony compounds. Such compounds are widely available or can be made in known ways. The type of antimony compound used is not critical, being a choice primarily based on economics. For example, as inorganic compounds, there can be used antimony oxide, $(Sb_2O_3)$; antimony phosphate; $KSb(OH)_6$; $NH_4SbF_6$; $SbS_3$; and the like. A wide variety of organic antimony compounds can also be used, such as antimony esters with organic acids; cyclic alkyl antimonities; aryl antimonic acids, and the like. Illustrative of the organic antimony compounds, including inorganic salts of such compounds are: KSb tartrate; Sb caproate; $Sb(OCH_2CH_3)_3$; $Sb(OCH(CH_3)CH_2CH_3)_3$; Sb polymethylene glycolate; triphenyl antimony; and the like. Expecially preferred is antimony oxide.

The amount of the aryloxy, halogenated flame retardant additive is not critical to the invention, so long as it is present in a minor proportion based on said compositions — major proportions are uneconomical and may detract from physical properties — but at least sufficient to render the thermoplastic resin flame retardant, non-burning or self-extinguishing, as the case may be. Those skilled in the art are well aware that the amount will vary with the nature of the flammable thermoplastic resin and the relative efficiency of the additive. In general, however, the amount of additive will be from 0.5 to 50 parts by weight of resinous component (a), with the lesser amounts providing flame retardancy, and the higher amounts being used for self-extinguishing properties. A preferred range will be from about 1.0 to 30 parts and an especially preferred range will be from about 5 to 25 parts of additive per 100 parts of resinous component (a). Smaller amounts of compounds highly concentrated in bromine or chlorine, and especially bromine, will be sufficient; likewise smaller amounts will be needed if the aryloxy groups are halogenated, especially bromine-containing. The amount of antimony compound can vary over a fairly wide range, but, in general, there is used from about 0.5 to about 20 parts by weight, expressed as antimony oxide, per 100 parts of thermoplastic resinous component (a), and preferably from about 1 to about 10 parts by weight of antimony oxide. Corresponding molar equivalent amounts of the other antimony compounds can be used. In the combinations of antimony and the additive used in this invention, the weight ratio in the combination can vary widely, but it is preferred to use from about 0.1 to 1.0 parts of antimony compound for each 1.0 part by weight of the aryloxy, halogenated additive component.

It is also regarded to be among the features of this invention to include in the compositions, other ingredients, such as reinforcements, e.g., filamentous glass, fillers, mold release agents, pigments, stabilizers, nucleating agents, and the like, in conventional amounts for their conventionally employed purposes.

The manner of adding the flame retardant additive to the thermoplastic resin is not critical; is conventional; and will be obvious to those skilled in the art. Preferably, however, each ingredient is added as part of a blend premix and the latter is mixed, e.g., by passage through an extruder, or by fluxing on a mill, at a temperature dependent on the needs of the particular compositions. The mixed composition can be cooled and cut up into molding granules and molded or extruded or formed into any desired shape.

It is to be understood that the compositions of this invention can be used in many different ultimate shapes. For example, they may be molded into three-dimensional articles, or formed into films, or shaped into fibers, by conventional techniques.

DESCRIPTION OF THE PREFERRED EMBODIMENTS

The following examples illustrate the preparation of certain compounds and compositions within the scope of this invention. They are not to be construed to limit the scope of the invention in any manner whatsoever.

The following procedure is used to prepare one of the additives used in the Examples. Decabromodiphenyl ether, 1440 g., 1.5 mole, 1500 g. of phenol, 16 moles, 120 g. of sodium hydroxide pellets, 3 moles, 2–5 g. of cuprous oxide and copper cleaning wool (to aid stirring and prevent settling of the $Cu_2O$ catalyst) are added to a 5 liter reaction vessel equipped with a stirrer, large Dean-Stark trap with reflux condenser, dropping funnel and thermometer. The mixture is heated with stirring until the first distillate comes off (almost 180°C.). At this point a vigorous reaction takes place with rapid distillation of water and phenol. After a few minutes, the vigorous reaction subsides, and the temperature is held at 170°–180°C., for ¾ hour, then the mixture is cooled to 20°–40°C. About 2 liters of toluene is added and the mixture is poured into 10-12 liters of 5% aqueous sodium hydroxide solution. The toluene phase is separated, purified by passing through alumina and the product, diphenoxyoctabromodiphenyl ether, is recovered by evaporation of the toluene. The bromine content is about 75% by weight and the product is an easily soluble glass (melting range 50°–75°C.).

In a similar fashion, phenoxypentabromobenzene is prepared from 1 mole of hexabromobenzene, 1.5 mole of sodium hydroxide, phenol, cuprous oxide and copper wool. The product contains 82% by weight of bromine and has a melting range under 100°C.

EXAMPLE 1

In an extruder are blended 70 parts by weight of poly(1,4-butylene terephthalate), 30 parts by weight of ¼ inch in length chopped fibrous glass reinforcement, 3 parts by weight antimony oxide, 1½ parts by weight of fumed colloidal silica (Cabot Co., Cabosil), and 9 parts by weight of diphenoxy octabromo diphenyl oxide. This composition is then run on a standard injection molding machine for several hours producing test bars and discs. There was no evidence at all of plate out during processing and molding.

COMPARATIVE EXAMPLE 1A

A composition identical to that of Example 1 was prepared with the exception that 7 parts by weight of decabromodiphenyl oxide was substituted for the 9 parts phenoxylated product (similar bromine content). This composition is molded over a period of several hours. Appreciable plate out is observed and white, crystalline deposits are detectable at vents.

The molded parts from Examples 1 and 1A were subjected to tests with the results summarized in the Table:

Table

Flammability and Physical Property Data on Polyester Compositions

| Example | 1 | 1A* |
|---|---|---|
| Oxygen Index** | 30.5 | 28 – 30 |
| Flammability, UL 94*** | SE-O | SE-O |
| Heat Distortion temp., °F. | 410 | 417 |
| Tensile strength, psi | 14780 | 13700 |
| Tensile elongation, % | 4.8 | 3.6 |
| Flexural strength, psi | 23400 | 21700 |
| Flexural modulus, psi | 1,050,000 | 1,100,000 |
| Izod impact strength, ft. lbs./in. notch | 1.6 | 1.6 |

*Control
**ASTM-D 2863
***Underwriters Laboratories Bulletin 94 flammability test. Test pieces are self-extinguishing within 5 seconds after two ten-second ignitions by an open flame, with no flaming dripping.

Flame retardant compositions according to this invention are made if the following substitutions are made in the formulations of Example 1.

For the diphenoxyoctabromodiphenyl ether, substitute phenoxypentabromobenzene, diphenoxyoctabromodiphenyl, diphenoxyoctachlorodiphenyl ether, diphenoxyoctachlorodiphenyl, monophenoxynonabromodiphenyl ether, triphenoxyheptabromodiphenyl ether, diphenoxytribromotrichlorodiphenyl ether and di-1-naphthyloxyoctabromodiphenyl ether.

In the compositions of Example 1, substitute for the poly(1,4-butylene terephthalate) an equal weight of poly(ethylene terephthalate), a high molecular weight poly(bisphenol-A carbonate) a terpolymer of acrylonitrile-styrene-butadiene, a poly(2,6-dimethyl-1,4-phenylene) ether resin and a 55:45 combination of poly(2,6-dimethyl-1,4-phenylene ether) resin and a high impact rubber modified polystyrene resin.

In the compositions of Example 1, omit antimony oxide, and substitute therefor, stoichiometrical amounts of triphenyl antimony and $Sb(OCH_2CH_3)_3$.

Brominated compounds which were evaluated as flame retardants in developing the present compositions included hexabromobenzene, melting point 323°C., decabromodiphenyl oxide - melting point 306°C., and decabromodiphenyl oxide - melting point 287°–306°C. All were deficient in that they were difficult to compound with most resins because of high melting points and it appears that dispersion uniformity may have been a function of the particle size of the compound. After compounding, the vapor pressures of the above-mentioned brominated compounds were sufficiently high so that they vaporized from the compositions and caused plate out in the molds. Although functionally adequate flame retardant compositions could be made from all of them, in practice, not one of the compositions based on these additives yielded trouble-free molding. As a means for evaluating plate out tendencies, 1 part of the proposed flame retardant was blended with the designated variety of powdered resin in test tubes. The test tubes were then inserted into holes in a heated aluminum block. The test samples in the bottom of the tubes were hot -- the top of the test tube extending from the block was cool. When this aluminum block was heated to approximately 265°C., a reasonable molding temperature, the resin being either poly(butylene terephthalate) or polyethylene terephthalate), one could observe the formation of any sublimate as a white ring around the top of the test tube just above the hot block. The presence of sublimate is evidence that there would be plate out during processing and molding. The three compounds listed above failed this test readily. In contrast, the respective phenoxylated brominated aromatics, diphenoxyoctabromodiphenyl ether, diphenoxyoctabromodiphenyl and phenoxypentabromobenzene, according to this invention, passed the test as evidenced by the lack of sublimation. Using this same test, the composition of Example 1 passes, while that of Comparative Example 1A fails. When a similar test is applied to other polymeric combinations, including a composition of poly(2,6-dimethyl-1,4-phenylene ether) and a styrene resin (General Electric, NORYL) which had been flame proofed with hexabromobenzene, sublimation failure by this test was quickly apparent. On the other hand, NORYL combinations with the three phenoxylated bromo aromatics enumerated above passed the test tube sublimate test, indicating that, again, there will be no plate out during molding.

Because of their excellent physical, mechanical, chemical, electrical and thermal properties, the flame retardant thermoplastic compositions produced herein have many and varied uses. They may be used alone as molding powders or mixed with other polymers and may contain fillers, both reinforcing, such as glass filaments, and non-reinforcing, such as wood flour, cloth fibers, clays and the like, as well as pigments, dyes, stabilizers, plasticizers, etc.

Although the above examples have shown various modifications of the present invention, other variations are possible in the light of the above teachings. It is therefore to be understood that changes may be made in the particular embodiments of the invention described which are within the full intended scope of the invention as defined by the appended claims.

I claim:

1. A flame retardant thermoplastic composition comprising:
   a. a normally flammable thermoplastic resin; and
   b. a flame retardant amount of either
      i. an additive of the general formula

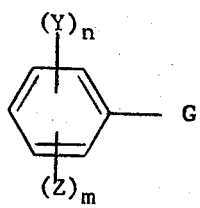

wherein Y is bromine or chlorine and mixtures thereof;
Z is mono or dicarbocyclic aryloxy, and mixtures thereof;
G is bromine, chlorine or

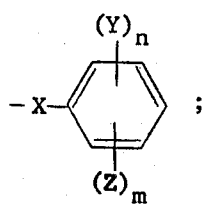

X is a direct bond or —O—; and
$n$ is 2, 3, 4 or 5 and $m$ is 0, 1 or 2, at least one of the $m$'s always being other than 0, and mixtures of the above additives or ii. a combination of said additive (i) and an inorganic or organic antimony-containing compound.

2. A flame retardant composition as defined in claim 1 wherein group G in said additive is

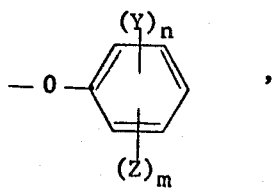

Y is bromine and Z is phenoxy.

3. A flame retardant composition as defined in claim 1 wherein groups G and Y in said additive are bromine, Z is phenoxy, $m$ is 1 and $n$ is 4.

4. A flame retardant composition as defined in claim 2 wherein said additive (i) is of the formula

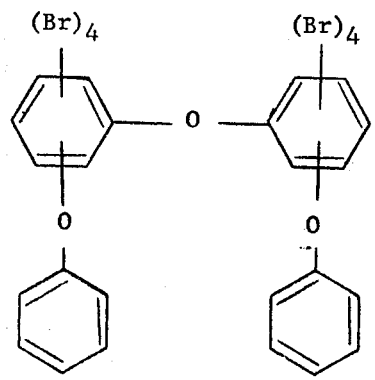

5. A flame retardant composition as defined in claim 1 wherein said normally flammable thermoplastic resin is selected from the group consisting of
a polymerization product of a vinyl monomer;
a polymerization product of an olefinic monomer;
a polymerization product of an acrylic or methacrylic monomer;
a polymerization product of an allyl monomer; or
a polyamide;
a cellulose ester;
an aromatic polycarbonate;
a polyphenylene ether or a mixture thereof with a polystyrene resin;
a polyester; and a mixture of at least two of the foregoing.

6. A flame retardant composition as defined in claim 5 wherein said normally flammable thermoplastic resin is a poly(alkylene terephthalate), isophthalate or mixed isophthalateterephthalate), said alkylene groups containing from 2 to 10 carbon atoms.

7. A flame retardant thermoplastic composition comprising:
a. a normally flammable poly(1,4-butylene terephthalate) or a normally flammable poly(ethylene terephthalate); and
b. from about 5 to about 25 parts by weight of an additive of the formula

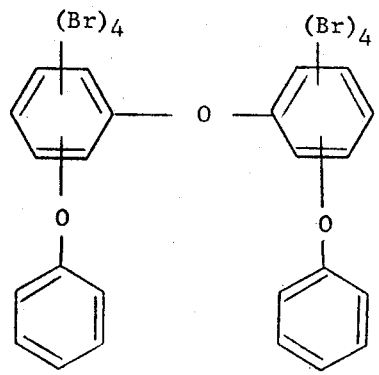

based on 100 parts by weight of component (a).

8. A flame retardant thermoplastic composition as defined in claim 7 which also includes from about 1 to about 10 parts by weight of antimony oxide based on 100 parts by weight of resinous component (a).

9. A flame retardant thermoplastic composition as defined in claim 7 wherein said normally flammable thermoplastic resin is poly(1,4-butylene terephthalate).

10. A flame-retardant thermoplastic composition as defined in claim 8 wherein said normally flammable thermoplastic resin is poly(1,4-butylene terephthalate).

11. A flame-retardant thermoplastic composition comprising:
a. a normally flammable thermoplastic resin; and
b. a flame-retardant amount of either
i. an additive of the general formula

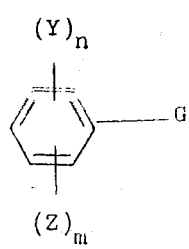

wherein Y is bromine or chlorine and mixtures thereof;

Z is unsubstituted mono- or dicarbocyclic aryloxy or substituted mono- or dicarboxylic aryloxy having substituents selected from the group consisting of alkyl and alkoxy; and mixtures thereof;

G is bromine, chlorine or

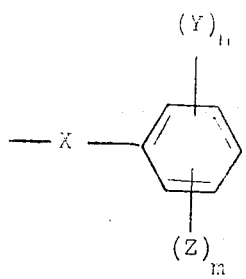

X is a direct bond or —O—; and $n$ is 2, 3, 4 or 5 and $m$ is 0, 1 or 2 at least one of the $m$'s always being other than 0, and mixtures of the above additives, or ii. a combination of said additive (i) and an organic antimony-containing compound.

* * * * *